Patented June 24, 1924.

1,498,641

UNITED STATES PATENT OFFICE.

NATHAN SULZBERGER, OF NEW YORK, N. Y.

ESTER OF P-CHLOR-M-CRESOL.

No Drawing.　　Application filed December 1, 1920.　Serial No. 427,509.

*To all whom it may concern:*

Be it known that I, NATHAN SULZBERGER, a citizen of the United States, residing at New York, in the county of New York, State of New York, have invented certain new and useful Improvements in Esters of p-Chlor-m-Cresol; and I do hereby declare the following to be a full, clear, and exact description of the invention, such as will enable others skilled in the art to which it appertains to make and use the same.

This invention relates to chemical and pharmaceutical products, which are, chemically, the condensation products or esters of p-chlor-m-cresol with lower fatty acids containing three or less than three carbon atoms.

In my prior Patent No. 1,031,971, I have generally disclosed and protected derivatives of meta-cresol with lower fatty acids, produced by treating meta-cresol or a derivative of the same, for example, with the chlorid of a lower fatty acid or with a chlorid of a derivative of such lower fatty acid. Among these derivatives, meta-cresyl acetate is particularly to be mentioned, as it has found extended use (under the trade name Cresatin), as a non-irritant antiseptic and analgesic for the treatment of mucous membranes, (particularly those of the nose, ear and throat) (see Journal of Pharmacology and Experimental Therapeutics, Vol. II, No. 6, July, 1911; the Laryngoscope, March, 1911; and Medical Record, Gonorrheal ophthalmia, February 5, 1916; New and non-official remedies accepted by Council on Pharmacy and Chemistry of the American Medical Association).

The esters of p-chlor-m-cresol with acetic acid, etc., are, in some respects, even more valuable than Cresatin or m-cresyl acetate. Para-chlor-meta cresol has been found to be the most powerful of the cresols and far superior as a disinfectant to all other phenol derivatives, but it has not been used extensively in therapeutics, because of its irritating action on mucous membranes. This disadvantage or objection can be eliminated or greatly reduced, by changing p-chlor-m-cresol into the form of an ester, such as the acetic ester. The resulting esters, moreover, retain many of the advantages of the p-chlor-m-cresol itself, in addition to their improved and modified properties which differentiate them from the free p-chlor-m-cresol. The esters of the present invention are very valuable disinfectants, but nevertheless free, or relatively free, from irritating and escharotic action, and many of them are therefore well adapted for use as antiseptics and analgesics, for the treatment of mucous membranes, etc.

In producing these esters, the p-chlor-m-cresol can, for example, be converted into the acetic acid ester by the action of acetic acid anhydrid, with the aid of a trace of concentrated sulfuric acid sufficient to bring about or promote the desired esterifying reaction. When acetic anhydrid is used as the esterifying agent, it is of advantage often to use a slight excess thereof so that the reaction may go to substantial completion and all of the p-chlor-m-cresol converted into the acetic ester. The production of this ester can be demonstrated, for example, by warming a mixture of 15 grams of p-chlor-m-cresol with 14 grams of acetic acid anhydrid (theory requires about 11 grams) just sufficiently to dissolve all of the p-chlor-m-cresol, then cooling to room temperature, and stirring with a glass rod, the tip of which has been dipped in concentrated sulfuric acid. By the use of such a "sulfuric acid glass rod," the liquid heats up immediately, due to the heat of reaction. If the reaction becomes too violent, the reaction mixture may be cooled. After standing a few minutes, the reaction product is distilled under ordinary pressure, for the recovery of the ester, which distills over at about 241–243° C. (uncorrected) as a colorless liquid of slight and agreeable odor. So also, instead of using sulfuric acid as a catalytic or condensing agent for promoting the reaction other suitable agents can be similarly used or the acetic acid anhydrid can be used without such an agent. The acetate may also be separated and recovered by pouring the reaction product into water, washing with dilute caustic soda and then by shaking it with water, then drying with calcium chloride and finally distilling or rectifying.

When the process is carried out on a larger scale, the apparatus can be provided with suitable heating and cooling means for controlling the temperature and preventing a too violent reaction. When the reaction is completed, the acetate can be recovered by distillation, in the manner above indicated. The acetate can thus be obtained with excellent yields.

Instead of using acetic acid anhydrid and a trace of sulfuric acid for the esterification, acetyl chloride can also be used, for example, in equimolecular proportions.

The p-chlor-m-cresol acetic acid ester is a water clear liquid, (which liquid condition is preferable for many purposes, to the solid condition of the free p-chlor-m-cresol) insoluble in water, soluble in alcohol, ether, glacial acetic acid, etc., and precipitated by water from its alcohol solution as a heavy oil. The product, dissolved in glacial acetic acid, forms no precipitate as the bromine is added drop by drop. When tasted, it has a numbing effect on the tongue, free from escharotic action. It is a valuable antiseptic and analgesic. On account of its non-escharotic action, it is of special value for treating infected mucous membranes, (dentistry) etc. It is soluble in oils and fats, for example, olive oil, and can be used in admixture therewith, or in a free and undiluted state. Its strong antiseptic properties are undoubtedly due to the p-chlor-m-cresyl group which it contains, while it is nevertheless free or relatively free from the objectionable irritating and escharotic action of p-chlor-m-cresol itself.

In a modified or similar manner, other esters of p-chlor-m-cresol can be made with other lower fatty acids containing three or less than three carbon atoms, or derivatives thereof, for example, propionic acid, phenyl-propionic acid, or cinnamic acid, phenyl-acetic acid, etc. In some cases, the meta-cresol-ester may be made first and then chlorinated. Also esters or derivatives of same of formic, and oxalic acids, etc., are included.

The ester of p-chlor-m-cresol with phenyl-acetic acid can thus be made by treating the p-chlor-m-cresol with phenyl acetyl chloride in equimolecular amounts. After the evolution of hydrochloric acid has ceased at ordinary temperature, or at the temperature of the reaction, the reaction mixture is heated on a steam bath until the evolution of gas has practically stopped. The ester can then be poured into water, taken up in ether, washed with dilute caustic soda and then with water, the ether dried with chloride of calcium, and then distilled off, leaving the ester. The ester can be distilled in vacuo. The ester is an oily liquid, water clear, having a faint, pleasant odor. The ester is soluble in glacial acetic acid, alcohol, ether, oils, etc. It is precipitated out of its alcohol solution by water. No escharotic effect is noticed when it is placed on the tongue. The ester cannot be distilled at ordinary pressure without decomposition but can be distilled in vacuo as an oily liquid. A sample formed a crystalline solid, when a previously formed crystal was added. The phenyl acetic ester of p-chlor-m-cresol has properties which make it even more advantageous, for certain purposes, than the phenyl acetic acid ester of m-cresol itself, although these two preparations are somewhat similar in certain of their properties and methods of production. The ester of p-chlor-m-cresol, in glacial acetic acid, does not give a precipitate as the bromine is added drop by drop.

The esters of the present invention can be used in a free state or in the form of solutions or compounded with oils or fats, etc. They may thus be used in making salves, and ointments (in tubes, etc.), and will impart a pleasing and agreeable odor as well as valuable antiseptic and other properties. They may also be compounded with soapy materials, or with alcohol, glycerine and water, and made in the form of emulsions, forming valuable and improved substitutes for materials such as lysol, etc. They may be mixed or compounded with other materials of a pharmaceutical or other nature (as, for instance, to increase their solubility in water, etc.), or mixtures of different esters may be compounded and used. Mixtures or solutions with other products, such as essential oils, aromatic substances, flavors, iodine, adrenalin, cocaine, and other pharmaceutical preparations, can thus be made, and such preparations will have strong antiseptic properties, due to the ester or esters. In the case of the phenyl acetic acid ester of p-chlor-m-cresol, the antiseptic properties are in part due to the phenyl acetic acid radical (phenyl acetic acid itself has been reported as non-poisonous and more antiseptic than carbolic acid, and has been found to reduce the temperature in typhoid and to increase the blood pressure). These esters or compositions or mixtures containing them can be used for various purposes where a product having antiseptic and other properties is desired, and particularly where powerful antiseptics are desired which are free, or relatively free from irritating action. They are thus well adapted for ear, nose and throat treatment, or the treatment of other muscous membrane, as well as for use as antiseptic and disinfecting agents, for example, in sterilizng or disinfecting surgical instruments or the hands; (alcoholic solutions, for example), in cases, also internally.

The new esters may be compounded with other esters, or may be produced in admixture with other esters, for example, by treating mixtures of p-chlor-m-cresol with other cresols or with phenol, and subjecting the entire mixture to esterification to produce a mixture of esters, particularly where a product is required which need not be of the highest uniformity or where the product is not required to undergo distillation which would separate esters of different boiling points. In cases, however, it may be preferable to prepare the esters, then chlorinate the mixture and separate by distillation.

It will thus be seen that the esters of the present invention relate to esters having valuable properties which are made by the condensation of p-chlor-m-cresol with lower fatty acids containing three or less than three carbon atoms, or derivatives of such acids. These esters can be decomposed with caustic soda.

The claims also include mixtures and solutions, etc., containing one or more of the esters of the present invention or derivative of such ester or esters.

I claim:

1. Esters of p-chlor-m-cresol with lower fatty acids having not more than three carbon atoms, said esters being antiseptics.

2. Acetic acid esters of p-chlor-m-cresol, obtainable by the combination of p-chlor-m-cresol with an acetic acid, said esters being valuable antiseptics.

3. The ester of p-chlor-m-cresol with acetic acid, said ester being liquid distilling under ordinary pressure at about 242° C. (uncorrected), said ester being insoluble in water but soluble in alcohol, ether and glacial acetic acid, and being of an antiseptic nature.

4. Esters of p-chlor-m-cresol with a derivative of a fatty acid having not more than three carbon atoms, said esters possessing antiseptic action.

In testimony whereof I affix my signature.

NATHAN SULZBERGER.